United States Patent [19]

Bosco et al.

[11] 4,273,795
[45] Jun. 16, 1981

[54] LOW-FAT SPREAD AND PROCESS

[75] Inventors: Peter M. Bosco, Brookfield Center; William L. Sledzieski, Norwalk, both of Conn.

[73] Assignee: Standard Brands Incorporated, New York, N.Y.

[21] Appl. No.: 95,644

[22] Filed: Nov. 19, 1979

[51] Int. Cl.³ .......................... A23D 3/00; A23D 5/00
[52] U.S. Cl. .................................... 426/602; 426/603; 426/604
[58] Field of Search .............. 426/602, 603, 604, 804

[56] References Cited

U.S. PATENT DOCUMENTS

| | | | |
|---|---|---|---|
| 1,917,273 | 7/1933 | Reynolds | 426/604 |
| 2,808,336 | 10/1957 | Kalish | 426/602 |
| 3,117,010 | 1/1964 | Geisler | 426/602 |
| 3,223,532 | 12/1965 | Pinkalla et al. | 426/602 |
| 3,360,378 | 12/1967 | Spitzer et al. | 426/604 |
| 3,437,494 | 4/1969 | Loter et al. | 426/602 |
| 3,483,004 | 12/1969 | Bauer et al. | 426/602 |
| 3,533,802 | 10/1970 | Cooper et al. | 426/602 X |
| 4,146,652 | 3/1979 | Kahn et al. | 426/602 X |

*Primary Examiner*—Robert A. Yoncoskie
*Attorney, Agent, or Firm*—Richard Kornutik

[57] ABSTRACT

Disclosed are a low-fat spread and a process for preparing it. The spread, can be flavored as desired, is solid at 40° F., preferably at 70° F., and will preferably comprise: from 10 to 30% of a dispersed fat; a continuous aqueous phase containing an emulsion stabilizer; and an emulsifier system comprising both lipophilic and hydrophilic emulsifiers. According to a preferred aspect of the process: the ingredients are emulsified at a temperature elevated sufficiently to maintain the fat in the liquid state; the emulsion is rapidly cooled; and, the cooled emulsion is then agitated to promote crystallization of the fat and enhance solidification. The product has a wide range of applications due to its texture, mouthfeel, appearance, and stability. It provides a rich tasting product with a caloric density which is preferably about 25 calories per 14 gram serving.

30 Claims, 3 Drawing Figures

LOW-FAT SPREAD AND PROCESS

BACKGROUND OF THE INVENTION

The present invention relates to low-fat content spreads. More particularly, the present invention relates to diet products of this type having low caloric densities and to processes for preparing them.

In our U.S. patent application Ser. No. 095,626, filed concurrently with this application, there is described a low-fat-content, butter-flavored spread and a process for preparing it. That spread can have fat contents of from 5 to 40% based on total weight and is solid at 40° F. That product is surprising in a number of respects for its close simulation of butter, and is especially surprising because of its low fat content. The description of that invention and the prior art relating to it are specifically incorporated herein by reference to said U.S. Ser. No. 095,626.

It has now been found that this new product and the process for making it have application to the production of a wide variety of spreads using flavors other than butter.

SUMMARY OF THE INVENTION

It is an object of the present invention to provide a low-fat spread and a process for preparing it.

It is another object of the invention to provide a low-fat spread, and a process for preparing it wherein the product can include proteins to enhance the flavor and nutrition of the product without adversely affecting emulsion stability.

It is a more specific object of the present invention to provide a low-fat spread and a process for preparing it, wherein the spread is solid at refrigerator temperature, about 40° F., and remains solid at serving temperatures for at least several hours.

It is a further specific object of the invention to provide a low-fat spread and a process for preparing it, wherein the product remains solid and easily spreadable at all temperatures within the range of from 32° to 75° F., yet melts down quickly in the mouth to release flavor without imparting a "waxy" mouthfeel and remains as a stable emulsion at temperatures up to 180° F.

It is yet a further specific object of the present invention to provide a low-fat spread and a process for preparing it, wherein the emulsion forming the spread remains stable when required during freeze/thaw cycling.

It is another specific object of the present invention to provide a low-fat spread and a process for preparing it, wherein the spread is based on an oil-in-water emulsion which is stable at refrigerator temperature for at least 6 months and at room temperature for at least 24 hours.

It is yet another and more specific object of the present invention to provide a low-fat spread and a process for preparing it, wherein the spread is based on an oil-in-water emulsion and remains solid and stable for reasonable periods at room temperature as well as being solid and stable at refrigerator temperature.

It is a further and yet more specific object of the present invention to provide a low-fat spread and a process for preparing it, wherein the spread is solid at room temperature for at least 5 hours and is based on an oil-in-water emulsion which remains stable for at least 24 hours at room temperature and for at least 6 months at refrigerator temperature, yet has a caloric density of less than 50, and preferably about 25, calories per 14 gram serving.

These and other objects are achieved according to the present invention which provides low-fat spread and a process for preparing it. The spread, in its broad aspects, comprises: a dispersed phase comprising from 5 to 40% fat, based on the weight of the spread; a continuous aqueous phase including a stabilizer; and an emulsifier system comprising a combination of a lipophilic emulsifier and a hydrophilic emulsifier; the relative and total amounts of the emulsifiers and the stabilizer being effective to provide a stable emulsion and a product which is solid at 40° F.

The process in its broad aspects comprises: preparing an oil-in-water emulsion comprising the ingredients for the spread as defined above, and cooling the emulsion under conditions effective to solidify it to form a product which is solid at 40° F.

BRIEF DESCRIPTION OF THE DRAWINGS

The invention will be better understood and its advantages will become more apparent from the following detailed description, especially when read in light of the following drawings, wherein.

DETAILED DESCRIPTION

Figure 1:
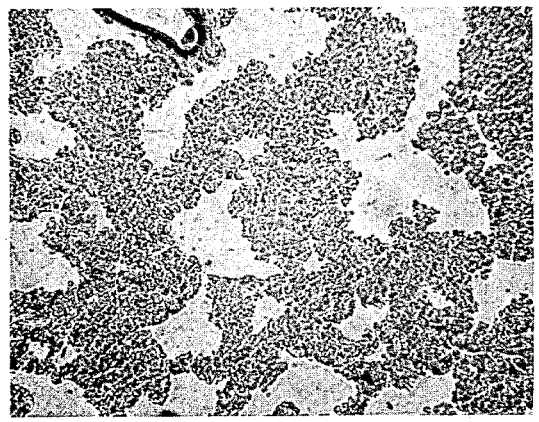
FIG. 1 is a photomicrograph, taken at 225 times magnification, of an emulsion according to the invention after solidification into the spread according to the invention.

The products of the invention, which are prepared by the process of the invention have a smooth, spreadable texture; a rich, creamy mouthfeel; and excellent stability; yet have caloric densities of less than 50, and preferably about 10 to 35, calories per 14 gram serving. The spreads are solid at refrigerator temperature and remain so even after standing for at least 2, and preferably 5, hours at a room temperature of 70° F. The spreads, which are based on stable oil-in-water emulsions, remain spreadable at normal refrigerator temperature, and melt quickly in the mouth to release flavor without imparting a waxy texture or mouthfeel.

The products can be flavored as desired to simulate dairy products such as butter, sour cream or cheese dips or spreads, cream cheese, processed cheese and the like; spreadable salad dressings such as mayonnaise; nutritious spreads such as margarine and peanut butter; and a wide variety of other spreadable products. Moreover, the invention enables the production of a wide variety of novel spreads, which have desirable new characteristics and are not simulations of known products.

The term "stable emulsion" identifies those emulsions which do not undergo any noticeable change in stability, due to water separation or otherwise, during storage in moisture-proof containers at a temperature of 40° F. or below for 6 months, and which will also remain stable when stored at a room temperature of 70° F. for a period of at least one day. Preferably, the emulsions of the present invention remain stable after melting, even at elevated temperatures of 180° F. or more.

The term "solid" is used in its normal sense, to mean the product does not flow under its own weight. Included within the scope of this term are plastic, spreadable compositions which, while not susceptible to flow under their own weight in small quantities, are easily spread with a knife. The products of the invention will exhibit penetrometer readings at 40° F. within the range of about 25 to 400 units, using a standard penetrometer cone, having a 2.5 inch diameter and a 45° angle, with 47.5 grams added weight at a 5-second interval. Preferably, the penetrometer readings will be within the range of from 60 to 250 units, and most preferably 100 to 200 units.

The products of this invention can be aerated if desired; however, it is an advantage of the invention that the products do not have to contain any significant quantity of air or inert gas to stiffen their structures and provide a firmer consistency. Thus, unlike many prior art products, the product itself, probably due to its unique microstructure, provides the solid consistency and there is no dependence upon the use of a gas to distend the emulsion structure to effect stiffening or solidification. To provide the smoothest overall texture, the degree of gas incorporation is preferably kept to less than 40%, and most preferably less than 20%, by volume.

Similarly, in distinction with some of the prior art compositions, those of the present invention do not depend upon the presence of protein to obtain the solid texture or the superior mouthfeel; however, they can contain proteins if desired.

Figure 2:
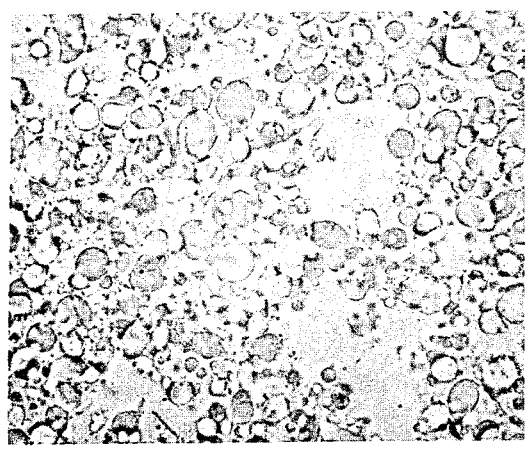
FIG. 2 is a photomicrograph, taken at 500 times magnification.

FIGS. 1 and 2 are microphotographs taken of a representative emulsion prepared in Example I. FIG. 1 was made at 225 times magnification and FIG. 2 was made at 500 times. Both show the unique microstructure of the product. It is believed that the chains of small bead-like oil droplets entangle, or coalesce or fuse at points, to form small interstices wherein the aqueous phase is physically trapped as well as being bound to some extent by the attraction for the oil due to the presence of the emulsifiers and stabilizers. The thickened state of the aqueous phase contributed by the stabilizers is also believed to aid in maintaining the unique solid structure of the products of this invention, even though the degree of thickening would not itself be sufficient to prevent it from flowing were it not for the other effects of the composition of the invention. These products are so stable that the emulsions do not separate even after standing for 24 hours or more at room temperature.

The ingredients which are essential to the formation of the product are: (1) fat which is suitably selected to have a Solids Fat Index (SFI) which enables the formation of a solid product on 40° F., (2) a water-soluble emulsion stabilizer, and (3) an effective emulsifier system comprising both lipophilic and hydrophilic emulsifiers.

The fat can be present in amounts within the range of from 5 to 40 percent based on the weight of the spread, but is preferably present in an amount of from 10 to 30 percent of weight of the spread.

The term "fat" as used herein is intended to include all edible, fatty acid triglycerides regardless of origin or whether they are solid or liquid at room temperature. Thus, the term "fat" includes normally liquid and normally solid vegetable oils and animal fats. Typical of the vegetable oils which are included are the usual vegetable oils such as soybean oil, corn oil, coconut oil, cottonseed oil, peanut oil, safflower oil, palm kernel oil, sunflower oil, palm oil, and rapeseed oil. The preferred fats for use in the invention will comprise partially-hydrogenated vegetable oils, and will most preferably be selected from the group consisting of soybean oil, corn oil, coconut oil, cottonseed oil, peanut oil, palm oil, palm kernel oil, safflower oil, sunflower oil, rapeseed oil, and mixtures of these. Preferred among these are those partially-hydrogenated vegetable oils which have an SFI profile within the following ranges:

| Temp. | Broad | Preferred |
| --- | --- | --- |
| 50° F. | 40–80% | 50–70% |
| 70° F. | 25–50% | 30–40% |
| 92° F. | <10% | <5%. |

Particular, suitable fats are 92° F. Wiley melting point partially-hydrogenated coconut oils sold under the trademarks Pureco 92 by Capitol City Products; Hydrol 92 by SCM Corporation; Victory 92 by Humko Div. Kraft Inc.; and Cobee 92 by PVO International, Inc.

The fat will preferably be selected to provide a solid product at 70° F., but will substantially completely melt in the mouth. Where necessary to increase the solids content at 40° F. or 70° F., an amount of a fat having a higher solids content can be added. Fats like hard stock stearin and cottonseed or soybean flakes have this ability, however, they remain solid and impart a waxy mouthfeel at eating temperature. Thus, while they can be employed to provide a desirable effect on texture, they should not be employed in large amounts.

The use of water-soluble emulsion stabilizers is essential to provide the necessary stability. These can be any of those known to the art for this purpose and will preferably be hydrophilic colloids, and can be selected from the group consisting of microcrystalline cellulose, carageenin, guar gum, alginate, xanthan gum, methyl cellulose, carboxymethyl cellulose, ethyl cellulose, hydroxypropylmethyl cellulose, dextrins, starch, gelatin, locust bean gum, soy protein isolate, pectin and the like, and mixtures of these. Commercial stabilizers available from Polak's Frutal Works, Inc. and identified by the manufacturer as Frimulsion Q8 and Frimulsion 10 have been found effective, especially when used in combination. The Q8 product is a blend of modified food starch, locust bean gum, guar gum, gelatin and pectin, and is preferably employed at a weight ratio within the range of from about 1:1 to 3:1 to the Frimulsion 10 which is a blend of locust bean gum and guar gum.

The stabilizer can be employed in any amount effective under the conditions of processing and with the particular ingredients. It has been found, however, that levels of about 0.1 to 3.0 percent, based on the total weight of the composition, are particularly effective. In addition to their emulsion stabilizing function, these materials also have a viscosity-increasing effect on the emulsion. However, this effect is not sufficient in and of itself to control the large amounts of water present in these emulsions. Thus, the present invention, unlike the approach taken by Bodor et al. in U.S. Pat. No. 4,103,037, does not depend upon a gelling agent to solidify the aqueous phase.

The composition of the invention further comprises an emulsifier system employing both lipophilic and hydrophilic emulsifiers. The relative and total amounts of the emulsifiers are selected to be effective to provide a stable emulsion and a product which is solid at 40° F. Typical of effective levels will be levels of from 0.3% to 4.0%, based on the weight of the total composition of the total emulsifier system which employs each of the hydrophilic and lipophilic emulsifiers at levels of at least 0.05%, on the same basis. The lipophilic emulsifier will typically have an HLB (hydrophile-lopophile balance) of less than 7, and the hydrophilic emulsifier will typically have an HLB of from 10 to 20, preferably from 11 to 17.

The emulsifier system is preferably present at a level of from 0.5% to 2%, and the lipophilic and hydrophilic emulsifiers are preferably each present at levels of at least 0.10%, all percentages on a formula weight basis.

The hydrophilic emulsifier will preferably comprise a member selected from the group consisting of polyoxyethylene (20) sorbitan monostearate, polyoxyethylene (20) sorbitan monooleate, and mixtures of these.

These emulsifiers, commonly known as polysorbate 60, and polysorbate 80, respectively, are preferred in the practice of this invention; however, it is believed that other hydrophilic emulsifiers with an HLB of between 10 and 20, and preferably 13 and 16, will be operable. Among other suitable emulsifiers are salts of fatty acid lactylates such as sodium and calcium stearoyl-2-lactylate; and the polyglycerol esters of fatty acids, such as octaglycerol monooleate. Also suitable are other of the polysorbates, such as polysorbate 65 which is otherwise known as polyoxyethylene (20) sorbitan tristearate. Various factors such as off-flavor, off-color and generally less desirable qualities of these other materials for use in foods make the aforementioned hydrophilic emulsifiers the most desirable choice in the practice of this invention. Polysorbate 60 and 80 are the most preferred because they provide a stiffness and spreading quality, especially a cold fracture quality, most like butter and margarine.

Polysorbate 60, polyoxyethylene (20) sorbitan monostearate, is a mixture of stearate and palmitate partial esters of sorbitol and sorbitol anhydrides condensed with approximately 20 moles of ethylene oxide ($C_2H_4O$) for each mole of sorbitol and its mono- and dianhydrides. It is a lemon to orange colored, oily liquid or semi-gel having a faint characteristic odor and a warm, somewhat bitter taste. It is soluble in water, aniline, ethyl acetate, toluene, and is soluble at low levels in mineral and vegetable oils. Polysorbate 60 is commercially available under the trademarks Tween 60 from ICI-Atlas, SVS-18 from Hodag, Inc., Drewpone 60 from PVO International Inc., and Durfax 60 from SCM Corporation, and GYSPS-20 from Glycol, Inc.

Polysorbate 80, polyoxyethylene (20) sorbitan monooleate, is a mixture of oleate partial esters of sorbitol and sorbitol anhydrides condensed with approximately 20 moles of ethylene oxide ($C_2H_4O$) for each mole of sorbitol and its mono- and dianhydrides. It is a yellow to orange colored, oily liquid having a faint, characteristic odor and a warm, somewhat bitter taste. It is very soluble in water, producing an odorless, nearly colorless solution, and is soluble in ethanol, fixed oils, ethyl acetate and toluene, Polysorbate 80 is commercially available under the trademarks Tween 80 from ICI-Atlas, SVO-9 from Hodag, Inc., Drewpone 80 from PVO International, Inc. and Durfax 80 from SCM Corporation, and GYSPO-20 from Glyco, Inc.

Polysorbate 65, polyoxyethylene (20) sorbitan tristearate, is not as preferred as polysorbate 60 or polysorbate 80, but still provides an acceptable product. It is a mixture of stearate and palmitate partial esters of sorbitol and its anhydrides condensed with approximately 20 moles of ethylene oxide ($C_2H_4O$) for each mole of sorbitol and its mono- and dianhydrides. It is a tan, waxy solid having a faint, characteristic odor and a waxy, somewhat bitter taste. It is soluble at low levels in mineral and vegetable oils; at higher levels in mineral spirits, acetone, ether, dioxane and methanol; and is dispersible in water and carbon tetrachloride. Polysorbate 65 is commercially available under the trademarks Tween 65 from ICI-Atlas, Drewpone 65 from PVO International, Inc. Durfax 65 from SCM Corporation, and GYSPTS-20 from Glyco, Inc.

The lipophilic emulsifier of the emulsifier system will preferably comprise a member selected from the group consisting of mixed fatty acid monoglycerides; mixed fatty acid diglycerides; mixtures of fatty acid mono- and diglycerides; lipophilic polyglycerol esters; glycerol esters, such as glyceryl monooleate, glyceryl dioleate, glyceryl monostearate, glyceryl distearate, glyceryl monopalmitate, and glyceryl dipalmitate, lactylated esters such as glyceryl-lacto esters of fatty acids, propylene glycol esters such as propylene glycol monopalmitate, propylene glycol monostearate, and propylene glycol monooleate; sorbitan esters such as sorbitan monostearate, sorbitan trioleate; sorbitan tripalmitate, sorbitan tristearate, and sorbitan sesquioleate; fatty acids or their soaps such as stearic acid, palmitic acid, and oleic acid; and mixtures thereof. Here, as in the case of the hydrophilic emulsifier, there is no known criticality in the use of any particular lipophilic emulsifier. Thus, it is fully intended that other equivalent materials can be employed with satisfactory results. However, those specifically identified above, especially those selected from the group consisting of lipophilic polyglycerol esters, mono- and diglycerides, propylene glycol esters, lactylated esters, and mixtures of these, are preferred from the standpoint of taste and effectiveness.

The products of the invention are suitably colored and flavored to obtain the desired taste and appearance. Examples of coloring agents are beta carotene, annatto, turmeric, caramel color, paprika and FD&C dyes. Typically, the colors will be dissolved or dispersed in oil or the water phase to expedite blending. Representative of the flavors and/or flavor enhancers will be sodium chloride, butter flavors, fruit flavors, spices, nut flavors, vegetable flavors, herbs, dairy flavors, distilled beverage flavors, cheese flavors, seafood flavors, meat flavors, candy flavors, essential oils, botanical extracts, oleo resins and other natural and synthetic flavors. Among the flavors suitable where a butter flavor is desired are lactones, lipolyzed butter oils and starter distillates; diacetyl, 2-octanone, and other ketones; butyric acid, hexanoic acid, and other free fatty acids; esters of butyric acid; delta-hydroxy acids and their glycerol esters; and mixtures of any of these with other known dairy, buttery, or like flavors or flavor notes. Among the fruit flavors are: apricot, apple, banana, blackberry, black currant, blueberry, cantaloupe, cherry, currant, grape, grapefruit, guava, honeydew, passion fruit, orange, peach, pear, pineapple, plum, prune, raspberry, raisin, strawberry, watermellon and the like. Among the vegetables are red and green peppers, tomato, carrot, celery, garlic, squash, pumpkin, onion, beet, pimento, turnip, parsley, chive, and the like. Among the dairy and cheese flavors other than butter are sour cream, yogurt, cheddar cheese, cream cheese, swiss cheese, blue cheese, parmesan cheese, romano cheese and the like. Among the meat flavors are pork, bacon, ham, beef, turkey, chicken, sausage, pepperoni, hot dog, barbequed meat, veal, lamb, and the like. The flavors can be artificial, natural extracts, concentrates, or fresh or dried natural ingredients in whole or chopped form. It is an advantage of the invention that flavors have a very pronounced impact.

In addition to emulsion stability, the products of the invention are preferably stable against microbiological and oxidative deterioration. To control mold and yeast growth, the products desirably contain one or more preservatives such as benzoic acid, sorbic acid, phosphoric acid, lactic acid and the soluble salts of these and other like materials. Preferred as antimicrobials are potassium sorbate, sodium sorbate, potassium benzoate, sodium benzoate and phosphoric acid. The pH of the aqueous phase is desirably maintained at a value below 6.0, and preferably within the range of 5.0 to 5.9, to provide effective microbial control and good flavor with the lowest necessary levels of preservatives. Additional stability against oxidative deterioration at higher temperatures may be obtained by the use of the usual antioxidants, typical among which are normal propyl gallate, the several tocopherols, butylated hydroxanisole (BHA), butylated hydroxytoluene (BHT), nordihydroguaiaretic acid (NDGA), tertiary-butylhydroquinon (TBHQ), and citric acid.

While the products of the invention do not require proteins to obtain the proper texture or mouthfeel, they are sometimes desired for nutritional reasons as well as their positive contribution to the flavor and physical properties of the product. Additionally, protein can enhance freeze/thaw stability. Among the suitable protein materials are any of those known to the art for similar uses in spreads. These can include those derived from vegetable as well as animal sources. Thus, vegetable protein isolates such as those derived from soy, peanut, cottonseed, alfalfa, pea, and the like; milk protein containing minerals such as non-fat dry milk, whey, caseinates, casein and delactosed whey; and other nutritional proteins, can be employed in desired amounts. One suitable type of protein is that sold under the Melotein MP-14P trademark by Dairyland, Inc. These products are spray dried blends of milk proteins such as sweet dairy whey and caseinates. Typically, they are added in amounts of up to 10% based on the total weight of the spread. Preferred levels will be from 1 to 8% on this basis.

Also added can be any of the vitamins and minerals desired. Preferred among these are vitamins A and D which are normally associated with diary products. If desired, these can be added in amounts approximating those in butter or margarine.

Also where desired, a chelating agent such as ethylene diaminetetraacetic acid (EDTA), its salts, such as calcium disodium EDTA, or the like can be employed to tie up metal ions which may otherwise detrimentally interact with one or more of the ingredients.

Figure 3:
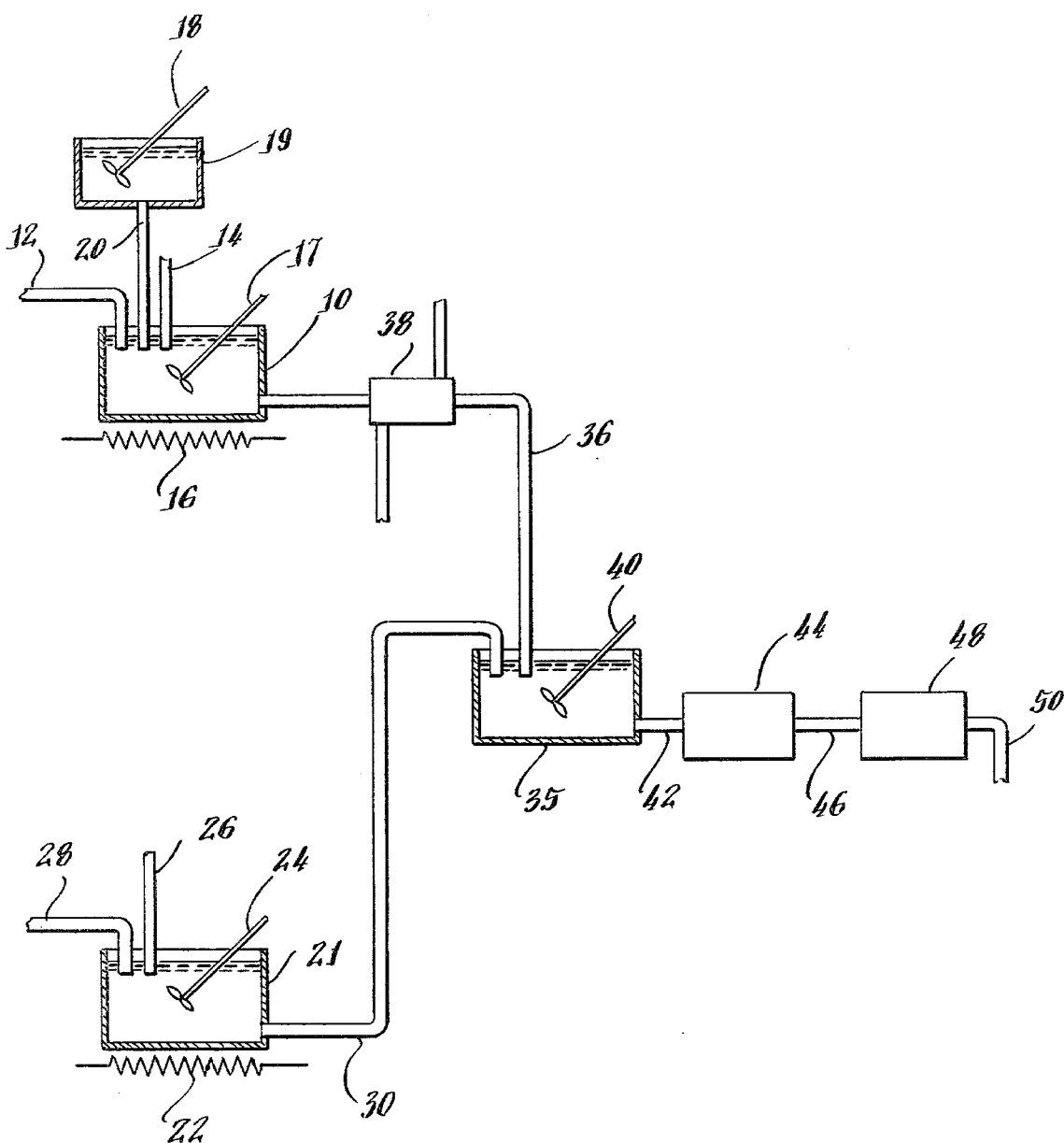
FIG. 3 is a flow diagram showing a preferred process scheme according to the invention.

All of the above ingredients can be formed into the lowfat, spread of the invention by following the preferred process scheme set out in FIG. 3, or otherwise preparing an oil-in-water emulsion comprising the essential ingredients, and then cooling the emulsion under conditions effective to solidify it and form a spread which is solid at 40° F., preferably at 70° F., and most preferably at 75° F.

The flow diagram of FIG. 3 shows the separate preparation of fat and aqueous phases prior to blending and emulsifying them. The water and water-soluble ingredients, such as milk protein solids, salt, and preservatives, are added to mixing vessel 10 by lines 12 and 14, respectively. The vessel may be equipped with a suitable heater 16 which can be a electrical resistance heater, a water or steam jacket, or the like. Alternatively, the water from line 12 can be supplied hot. Typically, the water will be heated to a temperature of about 190° F. to assure complete hydration of the water soluble materials added. Agitation is supplied by mixing device 17. Where the stabilizers, which are water soluble, are mixed with the water at this stage in processing, the shear supplied by the mixing must be intense enough to overcome the normal tendency of these materials to clump together and prevent complete hydration and dispersion. It is preferred, however, to predisperse the stabilizers in a portion of the the fat phase prior to contact with water. This can be accomplished by blending with mixing device 18 in vessel 19, and then passing to vessel 10 by line 20.

The fat phase is prepared in a separate vessel 20 which can also be equipped with a suitable heating device 22 and mixing device 24. The fat-soluble materials such as the color, flavor, vitamins, and emulsifiers, if desired, are added at 26 to the fat which is added at 28. The hydrophilic emulsifier can be added to the water phase instead of the fat phase. The fat is maintained at a temperature high enough to assure its liquid character. Temperatures of from about 120° to 190° F., preferably about 130° F. to 150° F., are effective to provide good solubility of additives and a suitably low viscosity.

The fat phase can be drawn from mixing vessel 21 by line 30 and passed to vessel 35 wherein it is mixed with the water phase which is supplied by line 36 and may have been cooled to approximately the same temperature as the fat phase by means of heat exchanger 38. Adequate mixing is provided by device 40 which supplies sufficient shear to begin the emulsification of the fat into the water. At the completion of mixing, an emulsion will have been formed which uniformly disperses the fat into droplets within the aqueous phase; however, the droplets are not broken down finely enough to permit emulsion stability.

The rough emulsion prepared in vessel 35 is then passed via line 42 to homogenizer 44 wherein the final emulsion is formed. The emulsion will, at this point, still be at a temperature sufficiently high to maintain the fat in the liquid state. Homogenization will typically be accomplished at a pressure of from 100 to 500, and preferably about 250, atmospheres. Any of the typical homogenizers or colloid mills effective for dairy purposes can be employed in this process. Thus, the Manton-Gaulin 2-stage homogenizer or the Cherry Berrell 2-stage homogenizer can be employed effectively.

From the homogenizer 44, the homogenized emulsion is passed via line 46 to a suitable heat exchanger 48 where it is cooled. The heat exchanger 48 will preferably be of a kind capable of rapidly cooling the emulsion. Typical of the suitable devices are scraped-wall heat exchangers ("A" units), such as those sold under the Votator trademark. Typically, the heat exchanger coolant will be maintained at a temperature of about −20° F. to cool the emulsion rapidly from about 140° to 160° F. to below about 70° F., and preferably below about 40° F.

The cooled emulsion is then preferably passed from the heat exchanger 48 via line 50 to a mixing chamber 52 wherein gentle agitation is maintained internally by a suitable rotating mixing device 54 for a period of time effective to initiate crystallization of the fat and the propagation of the unique physical structure of the product of the invention. The agitation promotes crystallization and enhances solidification. According to the most preferred mode of operation, a series, preferably about three, "A" units cool the emulsion; and a blender ("B" unit) is positioned at the end of the series, or between two of the "A" units in the series, to aid in promoting crystallization.

The spreads of the present invention can be printed into sticks, formed into pats or filled into tubs. Thus, these spreads, despite their low fat contents and high water contents, can have any desired physical appearance.

The following examples are presented for the purpose of further illustrating and explaining the present invention and are not to be taken as limiting in any regard. Unless otherwise indicated, all parts and percentages will be by weight.

EXAMPLE I

This example describes the preparation of a butter-flavored spread according to the present invention, and details the procedure for obtaining the microphotographs shown in FIGS. 1 and 2.

The spread is made from the following materials which are employed in the amounts listed:

| Ingredient | Amount (parts by wt.) |
| --- | --- |
| Coconut oil, 92° F. Wiley melting point | 19.0000 |
| Mono- and diglycerides[a] | 0.5000 |
| Polysorbate 60[b] | 0.5000 |
| Beta carotene (30% in oil) and vitamins | 0.0050 |
| Salt | 1.6500 |
| Butter flavor | 0.0200 |
| Stabilizer[c] | 1.0000 |
| Stabilizer[d] | 0.4000 |
| Water | 76.6743 |
| Potassium sorbate | 0.1300 |
| Sodium benzoate | 0.1000 |
| Phosphoric acid | 0.0150 |
| Calcium disodium EDTA | 0.0057 |

[a]Durem 114
[b]Durfax 60
[c]Frimulsion Q8
[d]Frimulsion 10

An aqueous phase is prepared by heating the water to 190° F. and adding the dry ingredients, and the Frimulsion Q8 and 10 stabilizers predispersed in a portion of the melted fat, to it with agitation. Mixing is continued until the stabilizers are uniformly dispersed and hydrated.

A separate fat phase is prepared by melting the fat and the emulsifiers at a temperature of about 150° F. The color and flavor are then admixed with the melt to obtain a uniform blend.

The aqueous and fat phases are then blended at about 160° F. to provide an emulsion. The emulsion is then homogenized in a Gaulin Laboratory homogenizer, Model 15M, set at 150 atm. first stage and 100 atm. second stage.

The emulsion is then cooled to 40° F. in about 15 minutes by slowly agitating with a Hobart Model N50 mixer fitted with a wire whip and a jacketed (water/alcohol coolant at approximately −20° F.) 5-quart mixing bowl. The resulting product is transferred to a tub and refrigerated for 24 hours. The resulting solidified spread exhibits a penetrometer reading of 130 units when measured by Krebs Penetrometer with a standard penetrometer cone having a 2.5 inch diameter and a 45° angle, with 47.5 grams added weight at a 5-second interval. (Penetrometer procedures according to ANSI/ASTM D217-68).

The spread is prepared for microphotography by placing a very small amount of product on a glass slide and carefully covering with a cover glass. Photographs at 225 and 500 times magnification are prepared and are reproduced in FIGS. 1 and 2.

The final product is heated to determine the stability and viscosity of the emulsion at various temperatures. Using a Brookfield RVT Viscometer fitted with a number 1 spindle, the emulsion exhibits the following viscosities at 10 rpm:

100° F.—880 centipoises
150° F.—500 centipoises
200° F.—310 centipoises

The emulsion is stable at all of these temperatures.

The product is tested to determine the type of emulsion by microscopic and colorimetric analysis. Under the microscopic test, a small amount of the product is placed on a microscope slide. A drop of water is then placed near the outer edge of the product. The interface between the product and the water is then observed. If the emulsion becomes diluted, i.e., water from the droplet enters the emulsion, the emulsion is of the oil-in-water type, with the water being the continuous phase. Under the colorimetric test, an intensely colored fruit juice, such as grape, elderberry, raspberry, or the like, is dropped on the surface of the product. If the color is absorbed by the product, the emulsion is of the oil-in-water type. If no color is absorbed, the emulsion is of the water-in-oil type. Under both tests, the emulsion of this example is found to be oil-in-water.

EXAMPLE II

This example describes the preparation of another butter-flavored spread according to the present invention. The details of the procedure are the same as in Example I. The only difference is that dairy solids are added and the proportions of the other ingredients must be adjusted accordingly.

The spread is made from the following materials which are employed in the amounts listed:

| Ingredient | Amount (parts by wt.) |
| --- | --- |
| Coconut oil, 92° F. Wiley melting point | 18.5000 |
| Mono- and diglycerides[a] | 0.5000 |
| Polysorbate 60[b] | 0.5000 |
| Beta carotene (30% in oil) and vitamins | 0.0050 |
| Salt | 1.6500 |
| Butter flavor | 0.0200 |
| Stabilizer[c] | 1.0000 |
| Stabilizer[d] | 0.4000 |
| Water | 73.6743 |
| Potassium sorbate | 0.1300 |
| Sodium benzoate | 0.1000 |
| Phosphoric acid | 0.0150 |
| Whey/caseinate blend[e] | 3.5000 |
| Calcium disodium EDTA | 0.0057 |

[a], [b], [c], and [d]: See Example I.
[e]Melotein Mp-14P.

The solidified spread exhibits a penetrometer reading of 175 units when measured as in Example I.

EXAMPLE III

This example describes the preparation of another butter-flavored spread according to the present invention, but this time containing about 30% fat. The procedure is the same as in Example I. The spread is made from the following materials which are employed in the amounts listed:

| Ingredient | Amount (parts by wt.) |
| --- | --- |
| Coconut oil, 92° F. Wiley melting point | 29.0000 |
| Mono- and diglycerides[a] | 0.5000 |
| Polysorbate 60[b] | 0.5000 |
| Beta carotene (30% in oil) and vitamins | 0.0050 |
| Salt | 1.6500 |
| Butter flavor | 0.0200 |
| Stabilizer[c] | 1.0000 |
| Stabilizer[d] | 0.4000 |
| Water | 66.6743 |
| Potassium sorbate | 0.1300 |
| Sodium benzoate | 0.1000 |
| Phosphoric acid | 0.0150 |
| Calcium disodium EDTA | 0.0057 |

[a], [b], [c] and [d]: see Example I.

The solidified spread exhibits a penetrometer reading of 175 units when measured as in Example I.

EXAMPLE IV

This example describes the preparation of yet another butter-flavored spread according to the present invention, again employing the procedure of Example I, but this time utilizing only 10% fat. The spread is made from the following materials which are employed in the amounts listed:

| Ingredient | Amount (parts by wt.) |
| --- | --- |
| Coconut oil, 92° F. Wiley melting point | 9.0000 |
| Mono- and diglycerides[a] | 0.5000 |
| Polysorbate 60[b] | 0.5000 |
| Beta carotene (30% in oil) | 0.0050 |
| Salt | 1.6500 |
| Butter flavor | 0.0200 |
| Stabilizer[c] | 1.0000 |
| Stabilizer[d] | 0.4000 |
| Water | 86.6791 |
| Potassium sorbate | 0.1300 |
| Sodium Benzoate | 0.1000 |
| Phoshoric acid | 0.0150 |
| Calcium disodium EDTA | 0.0057 |

[a], [b], [c] and [d]: see Example I.

The penetrometer reading for the final product is 227 units when measured as in Example I.

EXAMPLE V

This example describes the preparation of another butter-flavored spread according to the present invention, but this time utilizing different stabilizers. The spread is made from the following materials which are employed in the amounts listed:

| Ingredient | Amount (parts by wt.) |
| --- | --- |
| Coconut oil, 92° F. Wiley melting point | 20.0000 |
| Mono- and diglycerides[a] | 0.5000 |
| Polysorbate 60[b] | 0.5000 |
| Beta carotene (30% in oil) and vitamins | 0.0035 |
| Salt | 1.6500 |
| Butter flavor | 0.0320 |
| Stabilizer (89% micro-crystalline cellulose and 11% sodium carboxymethyl cellulose)[f] | 2.1000 |
| Water | 74.9613 |
| Potassium sorbate | 0.1300 |
| Sodium benzoate | 0.1000 |
| Phosphoric acid | 0.0250 |

[a] and [b]: see Example I.
[f]Avicel 581, FMC, Inc.

The procedure is essentially the same as that of Example I, but differing in that: the water is heated to only 160° F.; and the oil is heated to only 130° F.

The penetrometer reading for the final product is 82 units when measured as in Example I.

EXAMPLE VI

This example describes the preparation of another butter-flavored spread according to the present invention, but this time employing a different emulsifier system. Except for the change in formulation, the process is the same as in Example I. The spread is made from the following materials which are employed in the amounts listed:

| Ingredient | Amount (parts by wt.) |
| --- | --- |
| Coconut oil 92° F. Wiley melting point | 17.5000 |
| Glyceryl-lacto esters of fatty acid, lipophilic emulsifier[g] | 0.5000 |
| Octaglycerol monooleate, hydrophilic emulsifier (HLB = 13.0) | 2.000 |
| Beta carotene (30% in oil) | 0.0050 |
| Salt | 1.6500 |
| Butter flavor | 0.0200 |
| Stabilizer[c] | 1.0000 |
| Stabilizer[d] | 0.4000 |
| Water | 76.6743 |
| Potassium sorbate | 0.1300 |
| Sodium benzoate | 0.1000 |
| Phosphoric acid | 0.0150 |
| Calcium disodium EDTA | 0.0057 |

[c] and [d]: see Example I
[g]Durlac 100 WK

The resulting solidified spread exhibits a penetrometer reading of 117 units when measured as in Exhibit I.

EXAMPLE VII

This example describes the preparation of another butter-flavored spread according to the present invention, but this time employing soybean oil and employing a lower level of polysorbate 60 than in Example I. The process is the same as in Example I. The spread is made from the following materials which are employed in the amounts listed:

| Ingredient | Amount (parts by wt.) |
| --- | --- |
| Soybean oil, partially hydrogenated[h] | 19.2500 |
| Mono- and diglycerides[a] | 0.5000 |
| Polysorbate 60[b] | 0.2500 |
| Beta carotene (30% in oil) and vitamins | 0.0050 |
| Salt | 1.6500 |
| Butter flavor | 0.0200 |
| Stabilizer[c] | 1.0000 |
| Stabilizer[d] | 0.4000 |
| Water | 76.6743 |
| Potassium sorbate | 0.1300 |
| Sodium benzoate | 0.1000 |
| Phosphoric acid | 0.0150 |
| Calcium disodium EDTA | 0.0057 |

[a], [b], [c] and [d]: see Example I
[h]TEM-PLUS 95, Swift, Inc.

The resulting spread exhibits a penetrometer reading of 199 units when measured as described in Example I.

EXAMPLE VIII

This example describes the preparation of another butter-flavored spread according to the present invention, but this time employing polysorbate 80 in place of the low level of polysorbate 60 in Example VII. The process is the same as in Example VII. The spread is made from the following materials which are employed in the amounts listed:

| Ingredient | Amount (parts by wt.) |
| --- | --- |
| Coconut oil, 92° F. Wiley melting point | 19.2500 |
| Mono- and diglycerides(a) | 0.5000 |
| Polysorbate 80(i) | 0.2500 |
| Beta carotene (30% in oil) and vitamins | 0.0050 |
| Salt | 1.6500 |
| Butter flavor | 0.0200 |
| Stabilizer(c) | 1.0000 |
| Stabilizer(d) | 0.4000 |
| Water | 76.6743 |
| Potassium sorbate | 0.1300 |
| Sodium benzoate | 0.1000 |
| Phosphoric acid | 0.0150 |
| Calcium disodium EDTA | 0.0057 |

(a), (c) and (d): see Example I
(i)Durfax 80.

The resulting spread exhibits a penetrometer reading of 182 units when measured as in Example I.

EXAMPLE IX

This example describes the preparation of a mushroom-flavored spread according to the present invention. The details of the procedure are the same as in Example I. The principal differences are that flavors other than butter are added and the level of polysorbate 60 is reduced.

The spread is made from the following materials which are employed in the amounts listed:

| Ingredient | Amount (parts by wt.) |
| --- | --- |
| Coconut oil, 92° F. Wiley melting point | 19.4000 |
| Mono- and diglycerides(a) | 0.5000 |
| Polysorbate 60(b) | 0.2500 |
| Caramel color | 1.0000 |
| Salt | 2.0000 |
| Mushroom powder(j) | 2.0000 |
| Onion powder(k) | 0.5000 |
| White pepper(l) | 0.5000 |
| Stabilizer(c) | 1.0000 |
| Stabilizer(d) | 0.4000 |
| Water | 72.1993 |
| Potassium sorbate | 0.1300 |
| Sodium benzoate | 0.1000 |
| Phosphoric acid | 0.0150 |
| Calcium disodium EDTA | 0.0057 |

(a), (b), (c) and (d): see Example I.
(j)Beatrice Nature Tone
(k)McCormick
(l)McCormick

EXAMPLE X

This example describes the preparation of a garlic-flavored spread according to the present invention. The details of the procedure are the same as in Example I. The main differences are that flavors other than butter are added and the level of polysorbate 60 is reduced.

The spread is made from the following materials which are employed in the amounts listed:

| Ingredient | Amount (parts by wt.) |
| --- | --- |
| Coconut oil, 92° F. Wiley melting point | 19.4000 |
| Mono- and diglycerides(a) | 0.5000 |
| Polysorbate 60(b) | 0.2500 |
| Beta carotene (30% in oil) and vitamins | 0.0050 |
| Salt | 2.0000 |
| Garlic powder(m) | 4.5000 |
| Garlic flavor(n) | 0.5000 |
| Stabilizer(c) | 1.0000 |
| Stabilizer(d) | 0.4000 |
| Water | 71.1943 |
| Potassium sorbate | 0.1300 |
| Sodium benzoate | 0.1000 |
| Phosphoric acid | 0.0150 |
| Calcium disodium EDTA | 0.0057 |

(a), (b), (c) and (d): see Example I
(m)McCormick
(n)D & O Spisoseal

EXAMPLE XI

This example describes the preparation of a blue-cheese flavored spread according to the present invention. The details of the procedure are the same as in Example I. The main differences are that flavors other than butter are added and the level of polysorbate 60 is reduced.

The spread is made from the following materials which are employed in the amounts listed:

| Ingredients | Amount (parts by wt.) |
| --- | --- |
| Coconut oil, 92° F. Wiley melting point | 19.4000 |
| Mono- and diglycerides(a) | 0.5000 |
| Polysorbate 60(b) | 0.2500 |
| Titanium dioxide | 0.0300 |
| Salt | 2.0000 |
| Blue Cheese spice mix(o) | 3.8400 |
| Stabilizer(c) | 1.0000 |
| Stabilizer(d) | 0.4000 |
| Water | 72.3293 |
| Potassium sorbate | 0.1300 |
| Sodium benzoate | 0.1000 |
| Phosphoric acid | 0.0150 |
| Calcium disodium EDTA | 0.0057 |

(a), (b), (c) and (d): see Example I
(o)Hidden Valley Ranch Style, The H.R.V. Company.

EXAMPLE XII

This example describes the preparation of a sour cream flavored spread according to the present invention. The details of the procedure are the same as in Example I. The main differences are that flavors other than butter are added and the level of polysorbate 60 is reduced.

The spread is made from the following materials which are employed in the amounts listed:

| Ingredient | Amount (parts by wt.) |
| --- | --- |
| Coconut oil, 92° F. Wiley melting point | 19.4000 |
| Mono- and diglycerides(a) | 0.5000 |
| Polysorbate 60(b) | 0.2500 |
| Titanium dioxide | 0.1300 |
| Salt | 2.0000 |
| Sour cream powder(p) | 1.2000 |
| Stabilizer(c) | 1.0000 |
| Stabilizer(d) | 0.4000 |
| Water | 75.2193 |
| Potassium sorbate | 0.1300 |
| Sodium benzoate | 0.1000 |
| Phosphoric acid | 0.0150 |
| Calcium disodium EDTA | 0.0057 |

(a), (b), (c) and (d): see Example I
(p)Borden sour cream powder #66.

EXAMPLE XIII

This example describes the preparation of a bacon-flavored spread according to the present invention. The details of the procedure are the same as in Example I. The main differences are that bacon flavor is employed and the level of polysorbate 60 is reduced.

The spread is made from the following materials which are employed in the amounts listed:

| Ingredient | Amount (parts by wt.) |
|---|---|
| Coconut oil, 92° F. Wiley melting point | 19.4000 |
| Mono- and diglycerides$^{(a)}$ | 0.5000 |
| Polysorbate 60$^{(b)}$ | 0.2500 |
| Caramel color | 1.5000 |
| Salt | 2.0000 |
| Artificial bacon flavor$^{(q)}$ | 1.0000 |
| Stabilizer$^{(c)}$ | 1.0000 |
| Stabilizer$^{(d)}$ | 0.4000 |
| Water | 73.6993 |
| Potassium sorbate | 0.1300 |
| Sodium benzoate | 0.1000 |
| Phosphoric acid | 0.0150 |
| Calcium disodium EDTA | 0.0057 |

$^{(a),(b),(c)}$ and $^{(d)}$: see Example I
$^{(q)}$alex fries #2300.

EXAMPLE XIV

This example describes the preparation of a yogurt-flavored spread according to the present invention. The details of the procedure are the same as in Example I. The principal differences are that a different flavor is employed and the level of polysorbate 60 is reduced.

The spread is made from the following materials which are employed in the amounts listed:

| Ingredient | Amount (parts by wt.) |
|---|---|
| Coconut oil, 92° F. Wiley melting point | 19.4000 |
| Mono- and diglycerides$^{(a)}$ | 0.5000 |
| Polysorbate 60$^{(b)}$ | 0.2500 |
| Titanium dioxide | 0.0300 |
| Salt | 1.6500 |
| Artificial yogurt flavor$^{(r)}$ | 1.0000 |
| Stabilizer$^{(c)}$ | 1.0000 |
| Stabilizer$^{(d)}$ | 0.4000 |
| Water | 73.6743 |
| Potassium sorbate | 0.1300 |
| Sodium benzoate | 0.1000 |
| Phosphoric acid | 0.0150 |
| Calcium disodium EDTA | 0.0057 |

$^{(a),(b),(c)}$ and $^{(d)}$: see Example I
$^{(r)}$alex fries #800.

The above description is for the purpose of teaching the person skilled in the art how to practice the present invention. This description is not intended to detail all of the obvious modifications and variations of the invention which will become apparent upon reading. However, applicants do intend to include all such obvious modifications and variations within the scope of their invention which is defined by the following claims.

What is claimed is:

1. A low-fat spread comprising: a dispersed phase comprising from 5 to 40%, based on the weight of the spread, of fat having an SFI profile with the following ranges
   50° F.—40–80%
   70° F.—25–50%
   92° F.—<10%
   a continuous aqueous phase including a stabilizer; and an emulsifier system comprising a combination of a lipophilic emulsifier and a hydrophilic emulsifier, the emulsifier system being present in an amount of from 0.3 to 4.0%, based on the total weight of the spread, and each of the lipophilic and hydrophilic emulsifiers are present at levels of at least 0.05% on the same basis; the relative and total amounts of the emulsifiers and the stabilizer being effective to provide a stable emulsion and a product which is solid at 40° F.

2. A low-fat spread according to claim 1 wherein the fat comprises from 10 to 30% of the total weight of the spread.

3. A low-fat spread according to claim 1 wherein the fat comprises a partially-hydrogenated vegetable oil having an SFI profile with the following ranges:
   50° F.—50–70%
   70° F.—30–40%
   92° F.—<5%.

4. A low-fat spread according to claim 1 which exhibits a penetrometer reading at 40° F. within the range of 60 to 250 units using a standard penetrometer cone, having a 2.5 inch diameter and a 45° angle, with 47.5 grams added weight at a 5-second interval.

5. A low-fat spread according to claim 4, which exhibits a penetrometer reading within the range of 100 to 200 units under the same conditions.

6. A low-fat spread according to claim 1 wherein the hydrophilic emulsifier comprises a member selected from the group consisting of polyoxyethylene (20) sorbitan monostearate, polyoxyethylene (20) sorbitan monooleate, and mixtures of these.

7. A low-fat spread according to claim 1 wherein the hydrophilic emulsifier comprises polyoxyethylene (20) sorbitan tristearate.

8. A low-fat spread according to claim 1 wherein the hydrophilic emulsifier comprises octaglycerol monooleate.

9. A low-fat spread according to claim 1 having less than 40% by volume of gas incorporated therein.

10. A low-fat spread according to claim 1 wherein the stabilizer comprises from 0.1 to 3.0% of the total weight of the spread.

11. A low-fat spread according to claim 1 wherein the emulsifier system is present at a level of from 0.5 to 2.0%, and the lipophilic and hydrophilic emulsifiers are each present at levels of at least 0.1%, all percentages based on the total weight of the spread.

12. A low-fat spread according to claim 11 which is solid at 70° F.

13. A low-fat spread according to claim 12 wherein the stabilizer comprises from 0.1 to 3.0% of the total weight of the spread.

14. A process for preparing a low-fat spread, which comprises: preparing an oil-in-water emulsion comprising blending and emulsifying a dispersed phase comprising from 5 to 40%, based on the weight of the emulsion, of fat having an SFI profile with the following ranges
   50° F.—40–80%
   70° F.—25–50%
   92° F.—<10%, a continuous aqueous phase including a stabilizer, and an emulsifier system comprising a combination of a lipophilic emulsifier and a hydrophilic emulsifier, the emulsifier system being present in an amount of from 0.3 to 4.0%, based on the total weight of the spread, and each of the lipophilic and hydrophilic emulsifiers are present at levels of at least 0.05% on the same basis, and the relative and total amounts of the emulsifiers and the stabilizer being effective to provide a stable emulsion and a product which is solid at 40° F.; and cooling the emulsion under conditions effective to solidify it to form a product which is solid at 40° F.

15. A process according to claim 14 wherein the emulsion is agitated after cooling to promote crystallization and enhance solidification.

16. A process according to claim 14 wherein all of the ingredients are thoroughly blended, at a temperature sufficient to maintain the fat in a liquid state, prior to emulsification.

17. A process according to claim 16 wherein the emulsion is rapidly cooled to a temperature below 70° F. after emulsification.

18. A process according to claim 17 wherein the emulsion is agitated after cooling to a temperature of 50° F. or less.

19. A process according to claim 14 wherein the fat comprises from 10 to 30% of the total weight of the spread.

20. A process according to claim 14 wherein the fat comprises a partially-hydrogenated vegetable oil having an SFI profile with the following ranges:
   50° F.—50-70%
   70° F.—30-40%
   92° F.—<5%.

21. A process according to claim 14 wherein the hydrophilic emulsifier comprises a member selected from the group consisting of polyoxyethylene (20) sorbitan monostearate, polyoxyethylene (20) sorbitan monooleate, and mixtures of these.

22. A process according to claim 14 wherein the hydrophilic emulsifier comprises polyoxyethylene (20) sorbitan tristearate.

23. A process according to claim 14 wherein the hydrophilic emulsifier comprises octaglycerol monooleate.

24. A process according to claim 14 wherein the spread has less than 40% by volume of gas incorporated therein.

25. A process according to claim 14 wherein the stabilizer comprises from 0.1 to 3.0% of the total weight of the spread.

26. A process according to claim 14 wherein the spread is solid at 70° F.

27. A process according to claim 14 wherein the emulsifier system is present at a level of from 0.5 to 2.0%, and the lipophilic and hydrophilic emulsifiers are each present at levels of at least 0.1%, all percentages based on the total weight of the spread.

28. A process according to claim 27 wherein the spread is solid at 70° F.

29. A process according to claim 28 wherein the stabilizer comprises from 0.1 to 3.0% of the total weight of the spread.

30. A process according to claim 29 wherein the hydrophilic emulsifier comprises a member selected from the group consisting of polyoxyethylene (20) sorbitan monostearate, polyoxyethylene (20) sorbitan monooleate, and mixtures of these.

* * * * *

UNITED STATES PATENT OFFICE
CERTIFICATE OF CORRECTION

PATENT NO. : 4,273,795     Page 1 of 2
DATED : June 16, 1981
INVENTOR(S) : Peter M. Bosco, et al.

It is certified that error appears in the above-identified patent and that said Letters Patent are hereby corrected as shown below:

Column 2, line 4, the word "a" should appear before "low-fat".

Column 3, line 49, "on" should read -- at --.

Column 5, line 1, "lopophile" should read -- lipophile --;
line 45, "Glycol" should read -- Glyco --;
line 55, after "toluene", the comma should be replaced by a period.

Column 6, line 60, "pimento" should read -- pimiento --.

Column 7, line 19, "hydrox-" should read -- hydroxy- --;
lines 21-22, "tertiary-butylhydroquinon" should read
-- tertiary-butylhydroquinone --;
line 34, "minerals" should read -- materials --;
line 46, "diary" should read -- dairy --.

Column 8, line 16, "20" should read -- 21 --;
line 48, "Berrell" should read -- Burell --;
line 62, "52" should be deleted;
line 64, "54" should be deleted.

UNITED STATES PATENT OFFICE
CERTIFICATE OF CORRECTION

PATENT NO. : 4,273,795  
DATED : June 16, 1981  
INVENTOR(S) : Peter M. Bosco, et al.

Page 2 of 2

It is certified that error appears in the above-identified patent and that said Letters Patent are hereby corrected as shown below:

Column 11, line 18, "175" should read -- 166 --;  
line 39, "phoshoric" should read -- phosphoric --.

Signed and Sealed this

Twelfth Day of January 1982

[SEAL]

Attest:

Attesting Officer

GERALD J. MOSSINGHOFF

Commissioner of Patents and Trademarks